US009279971B2

(12) United States Patent
Jovin et al.

(10) Patent No.: US 9,279,971 B2
(45) Date of Patent: Mar. 8, 2016

(54) OPTICAL MODULATOR DEVICE AND SPATIO-TEMPORALLY LIGHT MODULATED IMAGING SYSTEM

(75) Inventors: Thomas M. Jovin, Goettingen (DE); Wouter Caarls, Delft (NL); Anthony De Vries, Goettingen (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 533 days.

(21) Appl. No.: 13/636,676

(22) PCT Filed: Mar. 18, 2011

(86) PCT No.: PCT/EP2011/001340
§ 371 (c)(1), (2), (4) Date: Nov. 16, 2012

(87) PCT Pub. No.: WO2011/116904
PCT Pub. Date: Sep. 29, 2011

(65) Prior Publication Data

US 2013/0063586 A1 Mar. 14, 2013

Related U.S. Application Data

(60) Provisional application No. 61/316,671, filed on Mar. 23, 2010.

(30) Foreign Application Priority Data

Mar. 23, 2010 (EP) .................................... 10003066

(51) Int. Cl.
*H04N 7/18* (2006.01)
*H04N 5/74* (2006.01)
(Continued)

(52) U.S. Cl.
CPC ........ *G02B 21/0048* (2013.01); *G02B 26/0833* (2013.01)

(58) Field of Classification Search
CPC ............. G02B 26/0833; G02B 27/283; G02B 21/365; H04N 9/315; H04N 9/3197; H04N 7/18; H04N 5/74; H04N 5/7441; H04N 5/7458; H04N 5/7425
USPC ..................... 348/79, 80, 759, 770, 771, 774; 359/291, 237
IPC ................................................ H04N 7/18,5/74
See application file for complete search history.

(56) References Cited

U.S. PATENT DOCUMENTS

2004/0263989 A1* 12/2004 Cobb et al. .................... 359/634
2007/0205378 A1 9/2007 Tomioka et al.
(Continued)

FOREIGN PATENT DOCUMENTS

EP 0911667 A1 4/1999
EP 0916981 A1 5/1999
(Continued)

OTHER PUBLICATIONS

Abstract for JP 2004-258620.
(Continued)

*Primary Examiner* — Sherrie Hsia
(74) *Attorney, Agent, or Firm* — Caesar Rivise, PC

(57) ABSTRACT

An optical modulator device (100), in particular for a spatio-temporally light modulated imaging system (200), comprises a light modulating micro-mirror device (110) comprising an array of mirror elements (111) arranged in a modulator plane (112), wherein each of the mirror elements (111) can be switched individually between first (111*a*) and second (111*b*) states with first and second tilting angles, resp., relative to a modulator optical axis (113) perpendicular to the modulator plane (112), and a first optical relaying device (120) being arranged for relaying light between the mirror elements (111) in the first (111*a*) state and a first optical axis (121) deviating from the modulator optical axis (113), wherein the first optical relaying device (120) includes a first group of imaging elements (122, 123, 124) being formed such that a planar light field (114) perpendicular to the modulator optical axis (113) is relayed to a first planar light field (125) perpendicular to the first optical axis (121). Furthermore, the spatio-temporally light modulated imaging system (200), in particular for confocal imaging an object (1) to be investigated, which includes the optical modulator device (100), and a method of confocal optical imaging using the imaging system (200) are described.

17 Claims, 5 Drawing Sheets

(51) Int. Cl.

| | |
|---|---|
| ***G02B 21/00*** | (2006.01) |
| ***G02B 26/08*** | (2006.01) |

(56) References Cited

U.S. PATENT DOCUMENTS

| | | | |
|---|---|---|---|
| 2007/0230157 | A1 | 10/2007 | Nagarekawa et al. |
| 2008/0156999 | A1 | 7/2008 | Nishiwaki et al. |
| 2008/0192336 | A1 | 8/2008 | Ohzawa |
| 2009/0141369 | A1 | 6/2009 | Destain |
| 2011/0038039 | A1 | 2/2011 | Takaura et al. |

FOREIGN PATENT DOCUMENTS

| | | | |
|---|---|---|---|
| EP | 0911667 | B1 | 4/2003 |
| EP | 0916981 | B1 | 7/2004 |
| JP | 59-90914 | U | 6/1984 |
| JP | 60-17417 | A | 1/1985 |
| JP | 2001305058 | A | 10/2001 |
| JP | 2004258620 | A | 9/2004 |
| JP | 200617706 | A | 1/2006 |
| JP | 2006133499 | A | 5/2006 |
| JP | 2007233241 | A | 9/2007 |
| JP | 2008164841 | A | 7/2008 |
| JP | 2008225455 | A | 9/2008 |

OTHER PUBLICATIONS

Abstract for JP 2008-164841.

Abstract for JP 2008-225455.

International Search Report for PCT/EP2011/001340 dated Apr. 20, 2011.

English-language abstract of JP6017417 (1985).

* cited by examiner

Detector camera
231
Detector camera
232
Micro-mirror device
110
215
216
140
141
211
210
100
130
131
132
133
120
121
122
123
110
113
220
1
200
Control device
250

OPTICAL MODULATOR DEVICE AND SPATIO-TEMPORALLY LIGHT MODULATED IMAGING SYSTEM

FIELD OF THE INVENTION

The present invention relates to an optical modulator device, which in particular is adapted for a spatio-temporally light modulated imaging system. More specifically, the present invention relates to an optical modulator device comprising a light modulating micro-mirror device, and an optical relaying device being arranged for relaying light from the micro-mirror device onto a predetermined optical axis, e. g. to a detector device. Furthermore, the present invention relates to a spatio-temporally light modulated imaging system, like in particular an optical imaging system with optical sectioning, e. g. a confocal optical imaging system. Furthermore, the present invention relates to a method of confocal optical imaging using the spatio-temporally light modulated imaging system and the optical modulator device. Applications of the invention are present in particular in confocal microscopy.

TECHNICAL BACKGROUND

Microscopic imaging of an object to be investigated with direct optical sectioning can be obtained with a plurality of confocal microscopy techniques. All known confocal microscopy techniques use point or pattern scanning systems with conjugate pairs of illumination and detection apertures for collecting light generated in response to an illumination in a focal plane within the object. Scanning systems using spatial light modulators like a micro-mirror device (or: "DMD", digital mirror device) provide a plurality of advantages in terms of data acquisition speed, spatial resolution and optical efficiency. The DMD provides an illumination of the object with a pattern sequence of illumination spots focused to conjugate locations in the focal plane of the object while simultaneously collecting detection light from the conjugate locations with a detector camera (see e.g. EP 911 667 A1 and EP 916 981 A1).

An example of a conventional spatially light modulated imaging system for confocal imaging an object 1' is schematically illustrated in FIG. 7 (prior art, see FIG. 3 of EP 911 667 A1). The conventional programmable confocal microscope 200' comprises a light source device 210', an imaging optic 220', a detector device 230' including two detector cameras 231', 232' and an optical modulator device 100', which is arranged for directing illumination light from the light source device 210' to the object 1' and for relaying detection light from the object 1' to the detector device 230'. To this end, the optical modulator device 100' includes a micro-mirror device 110' and first and second optical relaying devices 120', 130'.

The micro-mirror device 110' comprises an array of mirror elements 111', which can be tilted between two different tilting states resulting in first and second tilting angles relative to a normal of the micro-mirror device 110'. In the first tilting state 111*a*', the mirror elements 111' create illumination spots focused at conjugate locations in the object 1' and direct detection light from conjugate locations (conjugate image) via the first optical relaying device 120' to the first detector camera 231'. Simultaneously, the remaining mirror elements 111' in the second tilting state 111*b*' collect detection light from non-conjugate locations (non-conjugate image) in the object 1', which is directed via the second optical relaying device 130' to the second detector camera 232'. Both of the conjugate and non-conjugate images collected with the first and second detector cameras 231', 232' are used for obtaining a optically sectioned image of the object 1'.

The first and second optical relaying devices 120', 130' each consist of a plane mirror, which relays the detection light from the mirror elements 111' in the first (111*a*') and second (111*b*') states to optical axes 121', 131', resp. The optical axes 121', 131' are parallel to each other and to the axis from the imaging optic 220' to the micro-mirror device 110'. Due to the tilting of the mirror elements 111', the images from the conjugate locations and non-conjugate locations in the object 1' are not perpendicular but tilted relative to the optical axes 121', 131'. For preserving the image focus across the image, the detector cameras 231', 232' are rotated (tilted) relative to the optical axes 121', 131'.

The conventional optical design with rotated detector cameras results in a plurality of disadvantages, which may restrict the quality of confocal microscopic images. Firstly, due to the slanted incidence, directing the conjugate and non-conjugate images onto rotated detector cameras results in trapezoidal distortions ("keystoning") as well as increased reflection losses. This may represent a problem in particular with regard to the conjugate image inherently having a low intensity. Furthermore, the effective area of the detector camera is reduced due to the projection on the tilted detector camera. A further disadvantage may result from the fact that the conventional technique requires the provision of two separate detector cameras. Imaging both conjugate and non-conjugate images on a common detector camera would require complex optical elements, which again would reduce the light intensity. Using separate detector cameras may have disadvantages in terms of calibrating different sensitivities and resolutions relative to each other and rendering the system more expensive and complex.

The above disadvantages do not only occur with the example of FIG. 7 (prior art), but also with all other optical designs of conventional programmable confocal microscopes with micro-mirror devices as well as with other applications of micro-mirror devices, like e.g. for depletion microscopy methods.

OBJECTIVE OF THE INVENTION

The objective of the invention is to provide an improved optical modulator device, in particular for a spatio-temporally light modulated imaging system, being capable of avoiding disadvantages of conventional techniques. In particular, the objective of the invention is to provide an improved optical modulator device, which is capable of avoiding the disadvantages of a slanted incidence of detection light onto detector cameras. Another objective of the invention is to provide an improved spatially light modulated imaging system being provided with the above optical modulator device. Furthermore, the objective of the invention is to provide an improved method of confocal optical imaging avoiding disadvantages of conventional imaging techniques.

SUMMARY OF THE INVENTION

The above objectives are solved with an optical modulator device, a spatio-temporally light modulated imaging system and a method comprising the features of one of the independent claims. Preferred embodiments and applications of the invention are defined in the dependent claims.

According to a first aspect, the above objective is solved by an optical modulator device, in particular for a spatio-temporally light modulated imaging system, comprising a micro-mirror device and a first optical relaying device. The micro-mirror device comprises a plurality of reflective mirror elements, which are arranged in a common modulator plane. The micro-mirror device is capable of spatio-temporally modulating a light field, i. e. subjecting a light field to an amplitude modulation having a predetermined time-dependent geometric modulation pattern. Each of the mirror elements can be switched individually between two different tilting states, which are characterized by two different tilting angles of the mirror elements relative to a normal on the modulator plane (or: modulator optical axis). The two different tilting states are set and varied depending on the application of the optical modulator device, e. g. for providing a pattern sequence of illumination spots in confocal microscopy. Typically, the micro-mirror device is an integrated micro-mechanical device carrying the switchable reflective mirror elements on a surface thereof. The first optical relaying device comprises an optical set-up directing light reflected by the mirror elements in the first state to a first optical axis deviating from the modulator optical axis (or vice versa).

According to the invention, the first optical relaying device includes a first group of imaging elements (or: first imaging optical components), which image the light from the mirror elements in the first state to the first optical axis. The first imaging elements are arranged beyond the modulator optical axis. They comprise curved refractive and/or curved reflective parts which are formed such that a planar light field (or: planar image) being directed with perpendicular incidence onto the micro-mirror device, i.e. being perpendicular to the modulator optical axis, forms a first planar light field, which is perpendicular to the first optical axis. As the light path is reversible, a first planar light field perpendicular on the first optical axis is imaged to a planar light field on the modulator optical axis by the first group of imaging elements.

As a main advantage, the inventive optical modulator device resolves the classical "Scheimpflug"-problem associated with the recording of a planar image observed from a non-normal orientation. The planar light field traveling along the modulator optical axis comprises e.g. a planar image of light collected with a microscope optic. Contrary to the conventional relaying technique using plane mirrors, the microscopic image can be relayed as a planar image perpendicular to the first optical axis. Thus, the optical modulator device of the invention allows the transmission of the planar light field (e.g. microscopic image) onto another optical axis. A detector camera can be arranged such that the first planar light field (relayed microscopic image) is collected with normal incidence on the first optical axis or a subsequent light path thereof.

The inventive optical modulator device represents an optical unit, which can be provided in a spatio-temporally light modulated imaging system, like e.g. a confocal microscope, as an interchangeable module. Depending on the function of the optical modulator device, the modulator optical axis and the first optical axis can be optical input and/or output paths of the optical modulator device. Geometric and optical features of the micro-mirror device and with optical imaging properties of the first optical relaying device can be selected in dependence on the particular application of the imaging system.

According to a second aspect of the invention, a spatio-temporally light modulated imaging system, like e.g. a confocal microscope with patterned illumination, is equipped with the inventive optical modulator device of the above first aspect. The spatio-temporally light modulated imaging system comprises a light source device generating illumination light, an imaging optic focusing the illumination light onto a focal plane in an object to be investigated, a micro-mirror device being arranged between the light source device and the imaging optic for subjecting the illumination light to a spatial modulation, and a detector device having at least one detector camera, which is configured for collecting a detection light image created in the object in response to the patterned illumination. The term "detection light" refers to any type of light created in the object in response to the illumination, like e. g. fluorescence light or reflected light or transmitted light.

According to the invention, the spatio-temporally light modulated imaging system is equipped with the inventive optical modulator device including the micro-mirror device. The optical modulator device is arranged such that the detection light image traveling along the modulator optical axis is directed along the first optical axis towards the detector device. The at least one detector camera is positioned such that the detection light image is collected with normal incidence (or: substantially normal incidence) in the first optical axis or a subsequent optical path. The terms "normal incidence" or "perpendicular incidence" used here indicate the fact that the detection light image has exactly normal incidence or a non-zero angle of incidence deviating from 0°, e. g. up to 5°, preferably up to 3°. The non-zero angle can be realized depending on the practical optical set-up as a result of non-ideal adjustment or an intended deviation from the ideal normal incidence. In other words, the term "normal incidence" covers both cases of ideal normal incidence and slightly slanted incidence (slanted incidence, which has no or a negligible deteriorating effect on the image quality).

Advantageously, the inventive spatio-temporally light modulated imaging system represents an improvement of the conventional DMD based programmable array microscope, e.g. according to EP 911 667 A1 as the first optical relaying device allows a diffraction-limited normal detection of microscopic images using the at least one detector camera.

According to a third aspect of the invention, a method of confocal optical imaging using the imaging system according to the above second aspect is provided. The method comprises the steps of creating illumination light with the light source device, focussing the illumination light to focal plane in the object to be investigated with the imaging optic, and collecting detection light created in the object in response to the illumination light with the detector device. According to the invention, the detection light is directed with the inventive optical modulator device via the first optical axis towards the detector device where it is received by the at least one detector camera with normal incidence. Preferably, the illumination light is relayed from the first optical axis to the imaging optic using the inventive optical modulator device.

According to a preferred embodiment of the invention, the optical modulator device comprises a second optical relaying device including a second group of imaging elements being arranged between the micro-mirror device, in particular the mirror elements in the second tilting state and a second optical axis deviating from the modulator optical axis. Again, the second imaging elements are formed such that the planar light field (planar image) perpendicular to the modulator optical axis reflected by the mirror elements in the second state is relayed to the second optical axis where it forms a second planar light field extending in a plane perpendicular to the second optical axis.

Providing the optical modulator device with the first and second optical relaying devices has an advantage in simultaneous directing portions of the light field traveling on the modulator optical axis along to different optical axes, towards the detector device. With the confocal microscopy application of the invention, the planar light field perpendicular to the modulator optical axis reflected by the mirror elements in the first state represents the conjugate image, while the planar light field perpendicular to the modulator optical axis reflected by the mirror elements in the second state represents the non-conjugate image. Both conjugate and non-conjugate images can be simultaneously collected with perpendicular incidence on the at least one detector camera of the detector device.

Advantageously, a plurality of design variants exist with regard to the imaging elements of the first and/or second optical relaying devices. According to a preferred embodiment, at least one of the first and second groups of imaging elements comprise at least one reflective component, i.e. at least one imaging reflector (reflector with a curved reflective surface) and at least one refractive component (i.e. at least one optically transmissive element with imaging properties, like e.g. at least one optical lens).

According to a particularly preferred embodiment, at least one of the first and second groups of imaging elements comprise a spherical mirror reflecting light from the mirror elements in the first or second states towards the first or second optical axes, respectively, and at least one, preferably two correction lenses, which are tilted relative to the first and second optical axes, respectively. The inventors have found that with this combination of one spherical mirror and at least one, preferably two correction lenses the planar light field can be relayed from the modulator optical axis to the first (or second) optical axis (or vice versa). It is even sufficient to implement the optical modulator device with no more than three optical elements in each of the first and second groups of imaging elements.

The optical imaging properties of the imaging elements, in particular the geometric properties (like shape and/or size), the material (in particular refractive index of the refractive component (s)) and the position and orientation of the imaging elements relative to the light path from the micro-mirror device towards the first (or second) optical axis can be selected depending on the particular requirements of the application of the optical modulator device. The design task is solved with available iterative algorithms, provided e.g. with the commercial software "ZEMAX" (manufacturer: ZEMAX Development Corp., USA).

According to further preferred embodiments of the invention, at least one of the first and second optical axes is oriented in parallel to the modulator optical axis. The first and/or second optical axes can be displaced relative to the modulator optical axis but oriented parallel to each other resulting in a compact design of the spatially light modulated imaging system, like e.g. the confocal microscope. Alternatively, at least one of the first and second optical axes can be oriented non-parallel to the modulator optical axis.

Furthermore, if the optical modulator device is provided with at least one beam dump device, this may result in an improved image quality as the beam dump device is adapted for collecting residual light created at the mirror elements. As an example, the beam dump device can be arranged for collecting illumination light reflected by the mirror elements in the second state in the confocal microscope application.

According to a further preferred embodiment of the invention, the first and the second optical relaying devices are arranged symmetrically relative to the modulator optical axis. Particularly preferred, mirror symmetry with regard to a center plane including the modulator optical axis and being perpendicular to the plane of the modulator optical axis and the first and second optical axes is obtained. The symmetric structure results in advantages in terms of calibrating the images collected in the first and second branches of the imaging system.

For providing the interchangeable module for a spatio-temporally light modulated imaging system, the optical modulator device particularly preferred includes a carrier plate on which the micro-mirror device, the first optical relaying device and (optionally) the second optical relaying device are fixed. The components can be fixed directly on the carrier plate or using an adjustment element for each of the components. The adjustment element can be used for fine tuning the imaging properties of the optical set-up.

The light source device of the inventive imaging system comprises at least one first light source, which creates a first beam of illumination light. As an example, the first beam of illumination light is a collimated beam created e. g. with a laser device. According to a particularly preferred embodiment of the invention, the first optical relaying device is used not only for transmitting light from the mirror elements in the first state to the first optical axis, but also in the reverse direction for transmitting the collimated beam of illumination light along the first optical axis to the micro-mirror device, where it is reflected to the modulator optical axis. To this end, the first optical axis includes a first plane dichroic mirror being arranged for coupling the collimated beam of illumination light into the first optical axis. Due to the imaging properties of the inventive first group of imaging elements, the collimated beam of illumination light is relayed to a collimated beam of illumination light along the modulator optical axis patterned by the pattern of mirror elements in the first state.

Accordingly, with the preferred application in confocal microscopy, the mirror elements in the first state illuminate the object under investigation with a predetermined pattern sequence of illumination spots focused along the modulator optical axis to conjugate locations in the object and for reflecting detection light from the conjugate locations (conjugate image) along the modulator optical axis to the first optical axis and the detector device for forming the conjugate image on the at least one detector camera with normal incidence. Simultaneously, the mirror elements in the second state can reflect the detection light from non-conjugate locations (non-conjugate image) along the modulator optical axis to the second optical axis and the at least one detector camera of the detector device with normal incidence of the non-conjugate image.

The application of the invention is not restricted to the collection of the conjugate and non-conjugate images as proposed e.g. in EP 911 667 A1. Alternatively, other microscopy methods can be implemented, e.g. based on activation, depletion or conversions between ground and electronically excited states. Depending on the microscopy method, the inventive spatio-temporally light modulated imaging system preferably comprises at least one second light source creating a second collimated beam of illumination light along the second optical axis. Preferably, a second dichroic mirror is arranged for coupling the second collimated beam of illumination light into the second optical axis, where it is relayed via the second optical relaying device and the micro-mirror device towards the object to be investigated.

Further advantages of the invention can be obtained on the detection side. Multiple design variants are available for providing the detector device. According to a first variant, the detector device may comprise two separate detector cameras each of which being oriented perpendicularly to the first and second optical axes, respectively. Each of the two detector cameras is arranged for collecting the planar light fields on the first and second optical axes with normal incidence. In this case, the optical set-up of the imaging system may be facilitated.

Alternatively, the detector device may comprise two detector cameras, which are arranged side-by-side in a common detector path created by an image combiner device. The image combiner device includes image combiner reflectors, which are configured for reflecting the light fields traveling along the first and second optical axes into the common detector path. According to a further, especially preferred embodiment, one single detector camera can be provided in the common detector path, wherein the light fields from the first and second optical axes are collected with different light-sensitive fields of the single detector camera chip. Preferably, the detector camera includes a CCD chip, in particular an electron-multiplied CCD chip (EM-CCD chip) or a CMOS chip , in particular a noise-reduced, optionally cooled CMOS chip (manufacturer: Fairchild Imaging, USA) which offer advantages in terms of reduced noise and increased signal acquisition rate.

According to a further variant of the invention, the image combiner reflectors can be arranged such that the light fields from the first and second optical axes intersect each other along the common detector path. As a first advantage, at the intersection region, the diameter of the superimposed light field of both optical axes is narrowed so that both light fields can be simply filtered or otherwise manipulated for improving the detection efficiency. As an example, residual portions of the illumination light can be filtered out of the detection light preferably at the intersection of the light fields in the common detector path. As a further advantage, eventual unintended vignetting effects caused by the image combiner reflectors can be avoided. Due to the intersecting arrangement of the light fields, the normal incidence on the at least one detector camera deviated from the ideal perpendicular incidence. However, the advantages of the invention are preserved, if the intersection angle is preferably selected below 10°, particularly preferred below 6°, so that the angle of incidence is below 5°, particularly preferred below 3°.

According to a further preferred embodiment of the invention, the image combiner device can fulfill a second function in terms of directing the common detector path to another plane deviating from the modulator optical axis and first and second optical axes. As an example, the micro-mirror device with the first and/or second optical relaying devices are arranged in a first horizontal plane of the imaging system, while the detector device is arranged in a different horizontal plane separated vertically from the first horizontal plane. Accordingly, the optical set-up can be provided with a more compact structure. The size of the imaging system is minimized.

BRIEF DESCRIPTION OF THE DRAWINGS

Further advantages and details of preferred embodiments of the invention are described in the following with reference to the attached drawings, which show in.

PREFERRED EMBODIMENTS OF THE INVENTION

The following description of preferred embodiments of the invention refers in an exemplary manner to the application of the optical modulator device as a module in a programmable confocal microscope. It is emphasized that the use of the optical modulator device is not restricted to the microscope application, but in a corresponding manner possible with other spatio-temporally light modulated imaging systems, like e.g. conventional non-confocal microscopes. The preferred embodiments are described with particular reference to the features of the optical modulator device and the optical design of the spatio-temporally light modulated imaging system. Details of operating a confocal microscope can be implemented as it is known as such, e.g. from EP 911 667 A1 and EP 916 981 A1. In particular, the micro-mirror device can be operated with pattern sequences of illumination spots as conventionally known. Furthermore, the confocal and/or non-confocal images collected with the detector device can be evaluated and possibly further processed as it is known from conventional microscopy techniques. In particular the inventive spatio-temporally light modulated imaging system is compatible with conventional techniques with photoactivation, photoconversion and imaging modes, including super-resolution fluorescence, e. g. based on single-molecule activation/localization, ground or excited state depletion, excited states lifetimes and excitation and/or emission polarization, hyperspectral and excitation and/or emission micro-optics or microlens-array based light field techniques.

Figure 1:
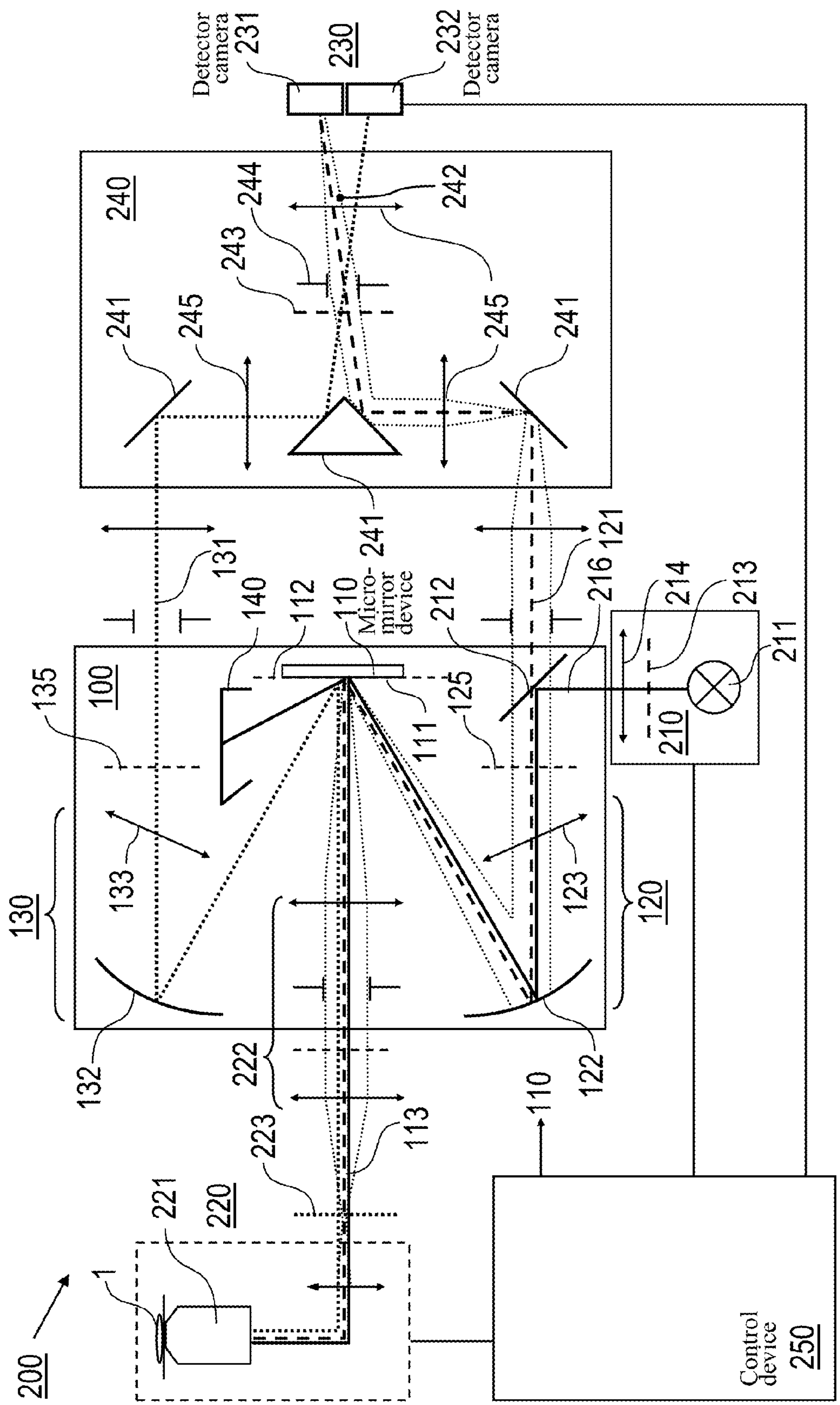
FIG. 1: a first embodiment of the inventive spatio-temporally light modulated imaging system including the inventive optical modulator device.

FIG. 1 illustrates a first embodiment of the inventive optical modulator device 100 provided as a component of an inventive spatio-temporally light modulated imaging system 200. The imaging system 200 comprises e.g. a confocal microscope including a light source device 210, an imaging optic 220, a detector device 230, an image combiner device 240 and a control device 250. The optical modulator device 100 (optionally with the light source device 210) can be provided with the image combiner device 240 and the detector device 230 in a common plane on a common platform (see FIGS. 1, 4 and 5) or on different planes vertically displaced relative to each other (see FIG. 6).

The optical set-up of the spatio-temporally light modulated imaging system 200 comprises an illumination light path extending from the light source device 210 via the optical modulator device 100 and the imaging optic 220 to the object 1 under investigation (schematically illustrated with a drawn line) and a detection light path extending from the object 1 via the imaging optic 220, the optical modulator device 100 and the image combiner device 240 to the detector device 230. The detection light path is split by the optical modulator device 100 into a first light path (illustrated with dashed line) extending via the first optical relaying device 120 and along the first optical axis 121 to the image combiner device 240 and a second light path (illustrated with thick dotted line) extending via the second optical relaying device 130 and the second optical axis 131 to the image combiner device 240. It is emphasized that the drawn, dashed and thick dotted lines are shown for illustrative purposes only. In practice, the main axes of all light paths coincide with each other, while the light fields have a certain lateral extension as illustrated with the thin dotted lines in the first light path.

The optical modulator device 100 which represents the first independent aspect of the invention comprises the micro-mirror device 110 and the first optical relaying device 120 as well as optionally the second optical relaying device 130 and the beam dump device 140. For conventional microscopy, the second optical relaying device 130 and the beam dump device 140 can be omitted. Furthermore, if a second light source is provided (see FIG. 4), a further beam dump device can be arranged on the optical modulator device 100.

The micro-mirror device 110 comprises an array of the mirror elements 111 arranged in a common modulator plane 112. The modulator optical axis 113 (common portion of the illumination light path and the detection light path) is perpendicular to the modulator plane 112, i. e. the normal on the modulator plane 112 coincides with the modulator optical axis 113. The micro-mirror device 110 comprises a micromechanical mirror array, in particular as included in a DMD, e. g. "TI DMD Discovery 1080p" (manufacturer: Texas Instruments) with an array of 1920 1080 mirror elements 111. The micromechanical mirror array is combined with an electronic and software module permitting the use of the full bandwidth (e. g. 25 kHz stream of binary images) of the micro-mirror device 110. Accordingly, extremely rapid frame rates of optical section images can be obtained, with a real-time display of the conjugate and non-conjugate images and their combination into an optically-sectioned image. The rate of image acquisition is dependent on imaging conditions, like e.g. the intensity of illumination, the length of the illumination pattern generation binary sequence, the performance parameters of the detector device and the nature of the object.

Figure 2:
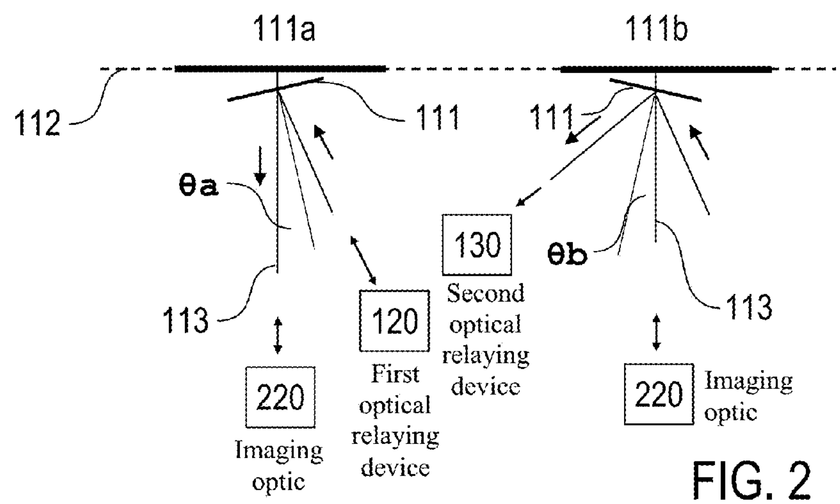
FIG. 2: details of a micro-mirror device.

An enlarged view of two exemplary mirror elements 111 of the mirror device 110 is illustrated in FIG. 2. The mirror elements 111 can be switched between a first state 111*a*, wherein the mirror element 111 is tilted relative to the modulator optical axis 113 (normal on the modulator plane 112) by a first angle θa, e.g. +12°, and a second state 111*b*, wherein the mirror element 111 has a second angle θb relative to the modulator optical axis 113, e.g. −12°. As a result, in the first state 111*a*, the illumination light is directed with an angle of 2·θa, e.g. 24° onto the micro-mirror device 110 so that the light is reflected by the mirror element 111 along the modulator optical axis 113 to the imaging optic 220. Simultaneously, detection light from the conjugate locations in the focal plane of the object 1 is directed from the imaging optic 220 along the modulator optical axis 113 towards the first optical relaying device 120. On the contrary, the mirror elements 111 in the second state 111*b* direct the illumination light towards another direction, where it is collected with the beam dump (see FIG. 1). Simultaneously, the detection light from the non-conjugate locations in the object 1 is directed to the second optical relaying device 130 for collecting the non-conjugate image.

Figure 3:
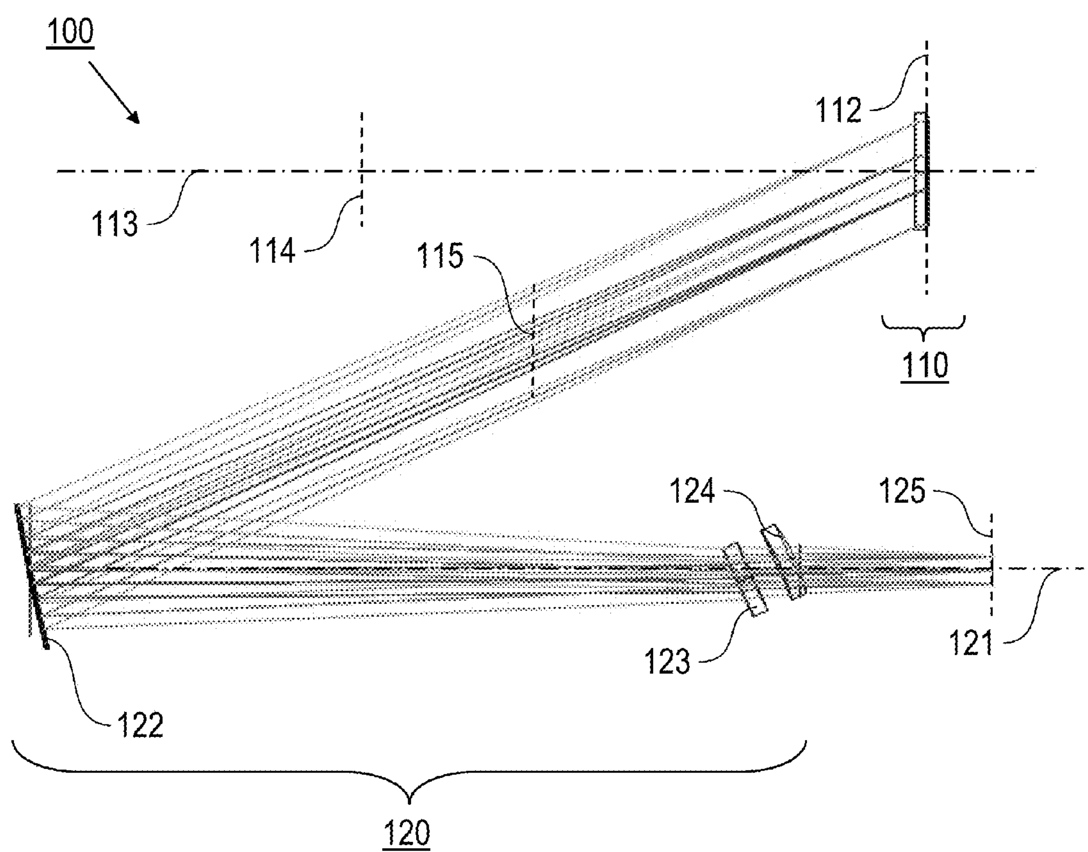
FIG. 3: a preferred embodiment of the first optical relaying device.

Further details of the optical modulator device 100 including the micro-mirror device 110 and the first optical relaying device 120 are illustrated in FIG. 3. The first optical relaying device 120 comprises the spherical mirror 122, e.g. an off-axis parabolic mirror, and two tilted correction lenses 123, 124. The light. field traveling along the modulator optical axis 113 is reflected by the mirror elements 111*a* in the first state towards the spherical mirror 122 and by the spherical mirror 122 onto the first optical axis 121. A planar light field (image) 114 perpendicular to the modulator optical axis 113 is slanted by the reflection at the micro-mirror device 110 (see schematic illustration at 115). This distortion is compensated by the imaging properties of the mirror lens-combination 122, 123, 124, so that a first planar light field 125 perpendicular to the first optical axis 121 is obtained. The planar light field 125 travels along the first optical axis 121, where it is subjected to a further imaging optic.

As an example, the spherical mirror 122 and the two tilted correction lenses 123, 124 have the following properties. The spherical mirror 122 is made of glass, preferably with a broad-band reflection coating with a radius of e. g. 50 mm and having a parabolic curvature of e. g. 500 mm. The correction lenses 123, 124 are made of glass, preferably a fluorescence-free glass, like e. g. N-SF6-HT or N-FK5 glass with a radius of 24 mm, a thickness of 4 or 4,3 mm, resp., and front and back curvatures of 140,4 mm and 134,2 mm, resp./ 47,7 mm and 47,3 mm, resp.

Figure 6:
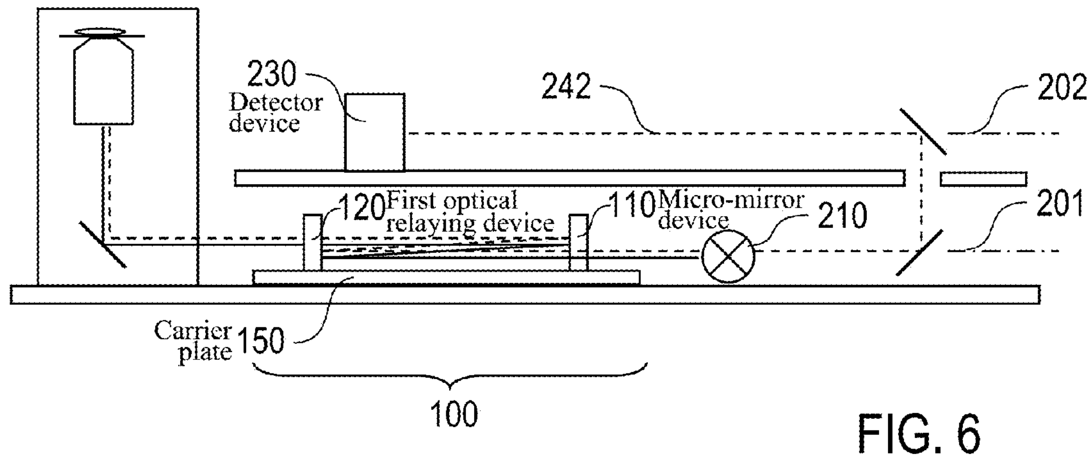
FIG. 6: a sectional view of a further embodiment of the inventive spatio-temporally light modulated imaging system.
Figure 7:
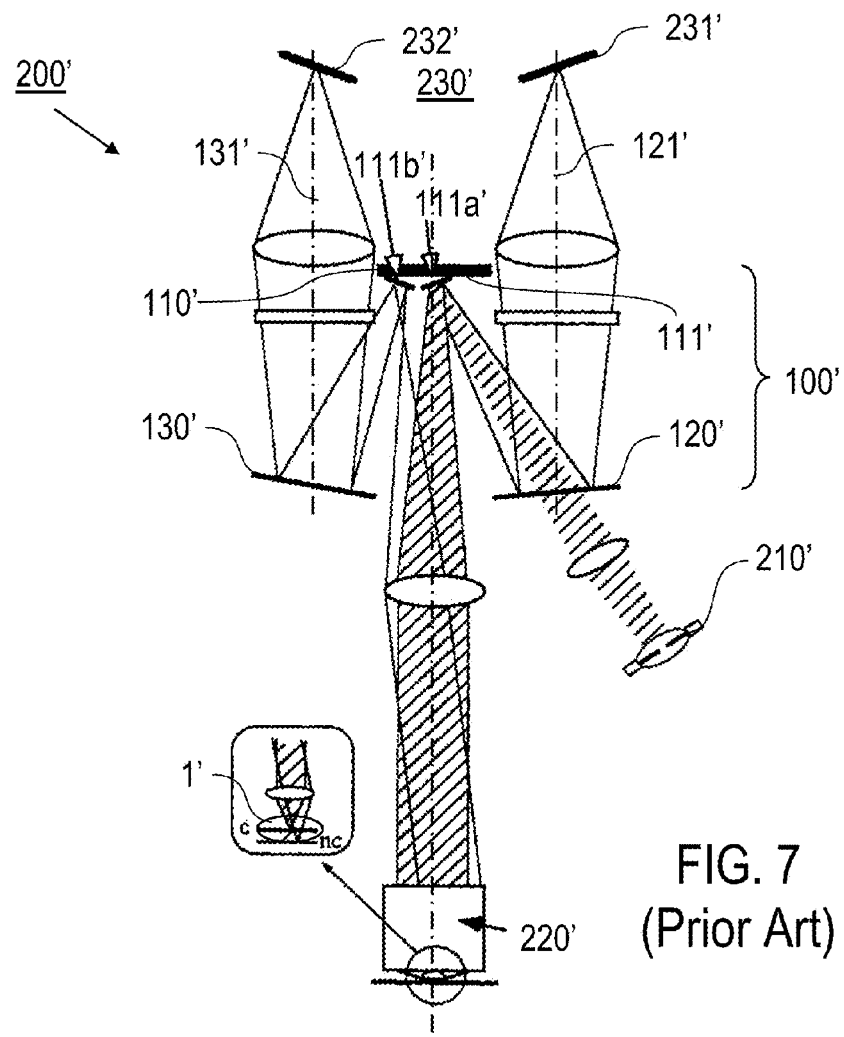
FIG. 7: the optical set-up of a conventional programmable confocal microscope (prior art).

The micro-mirror device 110 and the first optical relaying device 120 are arranged on a common carrier plate (see 150 in FIG. 6). The second optical relaying device 130 (see FIG. 1) is designed like the first optical relaying device 120, with the imaging elements 132, 133, 134 being mirrored relative to the imaging elements 112, 123, 124 of the first optical relaying device 120. The second optical relaying device 130 has the same effect on the detection light reflected by the mirror elements 111 in the second state 111*b* towards the second optical axis 131, so that a second planar light field 135 is created travelling along the second optical axis 131.

Referring again to FIG. 1, the light source device 210 comprises the first light source 211, a first dichroic excitation filter 213 and a first collimating optic 214. The first light source 211 comprises e.g. one single laser device emitting one single laser line or multiple laser lines, a plurality of laser devices each emitting at least one laser line, at least one light-emitting diode (LED), or a white broadband lamp. Preferably, the first light source 211 generates illumination light in the range of 350 nm to 850 nm. As a preferred example, an LED-array source with a selectable emission wavelength (e.g. type "PhlatLight", manufacturer: Luminus Devices, Inc.) or a broadband laser-plasma light source emitting e. g. in the range from 170 nm to 800 nm (e.g. type "EQ-99", manufacturer: Energetiq) is used. The excitation filter 213 is an optional feature, which is provided for shaping the wavelength characteristic of the illumination light created with the light source 211. The excitation filter can be omitted, if the light source comprises one single line laser only. The collimating optic 214 creates a collimated beam 216 of illumination light, which is directed via the dichroic mirror 212, the first optical relaying device 120, the spatial mirror 110 and the imaging optic 220 to the object 1 under investigation.

The imaging optic 220 comprises a microscope objective 221 and a microscope relay optic 222. The microscope objective 221 is provided for focusing illumination light into a predetermined focal plane within the object 1. The detection light field created in the focal plane is imaged to the microscope image plane 223, which is imaged with the microscope relay optic 222 onto the micro-mirror device 110. The microscope relay optic 222 provides a telecentric image of the microscope image plane 223 on the micro-mirror device 110. Subsequently, the detection light field is relayed via the first optical axis 121 and the image combiner device 240 to the detector device 230.

The image combiner device 240 comprises a plurality of image reflectors 241, which combine the first and second optical axes 121, 131 into the common detector axis 242. The image combiner reflectors 241 comprise plane reflecting surfaces, like e.g. plane mirrors and/or the central prism as shown. Alternatively, the image combiner reflectors can be curved for imaging purposes. Furthermore, the image combiner device 240 includes an emission filter 243, a optical diaphragm 244 and imaging lenses 245. The emission filter 243 is provided for transmitting light with wavelengths of the detection light only, e.g. fluorescence light from the object 1, while other wavelengths, like e.g. the illumination wavelength are blocked. The imaging lenses 245 provide a telecentric imaging of the light fields from the first and second optical axes 121, 131 onto the detector cameras 231, 232 of the detector device 230.

As shown in FIG. 1, the image combiner reflectors 241 are arranged such that the light fields from a first and second optical axes, 121, 131 intersect each other in the common detector path 242. The intersection is located at the position of the diaphragm 244 arranged for telecentric imaging. Alternatively, the image combiner reflectors 241 can be arranged such that the light fields from the first and second optical axes 121, 131 are arranged adjacent to each other without an intersection. In both cases, the angle of incidence is slightly above 0°, e.g. in the range from 0° to 5°, as e. g. 2°.

According to FIG. 1, a control device 250 is provided, which is connected in particular with the light source device 210, the micro-mirror device 110, the imaging optic 220 and the detector device 230. The control device 250 is arranged for controlling the steps of the inventive method of confocal optical imaging, in particular for controlling the above components and for collecting electrical signals, like image data from the detector device 230. The particular function of the control device 250, which can be implemented by a personal computer with an adapted control circuitry, depends on the particular type of confocal microscope. Preferably, the control device 250 includes a rapid graphics card for real-time processing the conjugate and non-conjugate image data.

Figure 4:
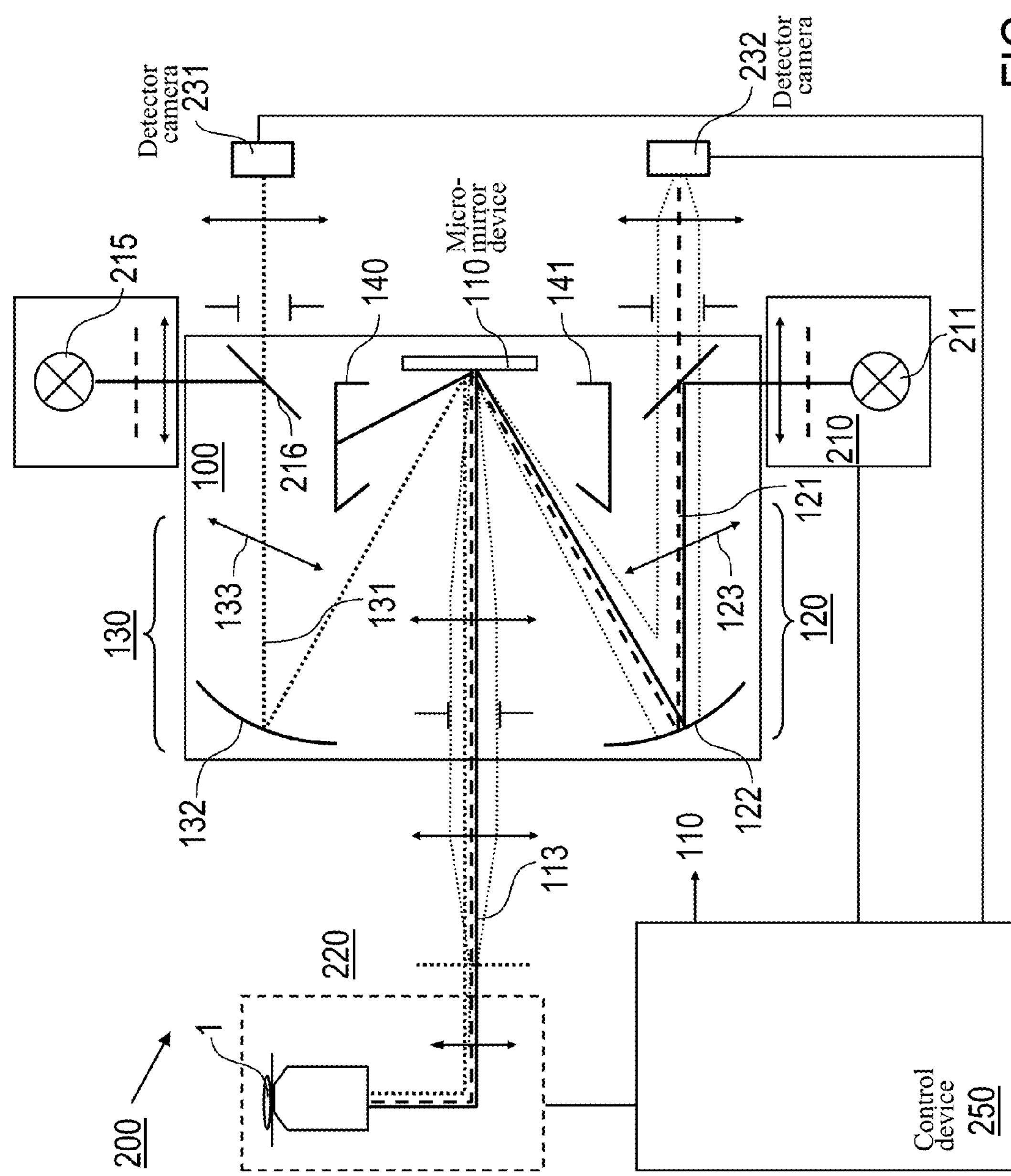
FIG. 4: a second embodiment of an inventive spatio-temporally light modulated imaging system including the optical modulator device.

FIG. 4 illustrates an alternative embodiment of the spatio-temporally light modulated imaging system 200 comprising the light source device 210, the optical modulator device 100, the imaging optic 220 and the detector cameras 231, 232 and having a similar design like the embodiment of FIG. 1. Differences are related to the provision of a second light source 215, a second beam dump 141 and the omission of the image combiner device. Furthermore, contrary to the embodiment of FIG. 1, the two detector cameras 231, 232 of the detector device are arranged separated from each other directly in the optical axes 121, 131. The embodiment of FIG. 4 is particularly useful for implementing microscopy methods requiring two different light sources for switching between distinct electronic states of fluorophors, e. g. depletion microscopy methods, with the inventive spatio-temporally light modulated imaging system 200.

Figure 5:
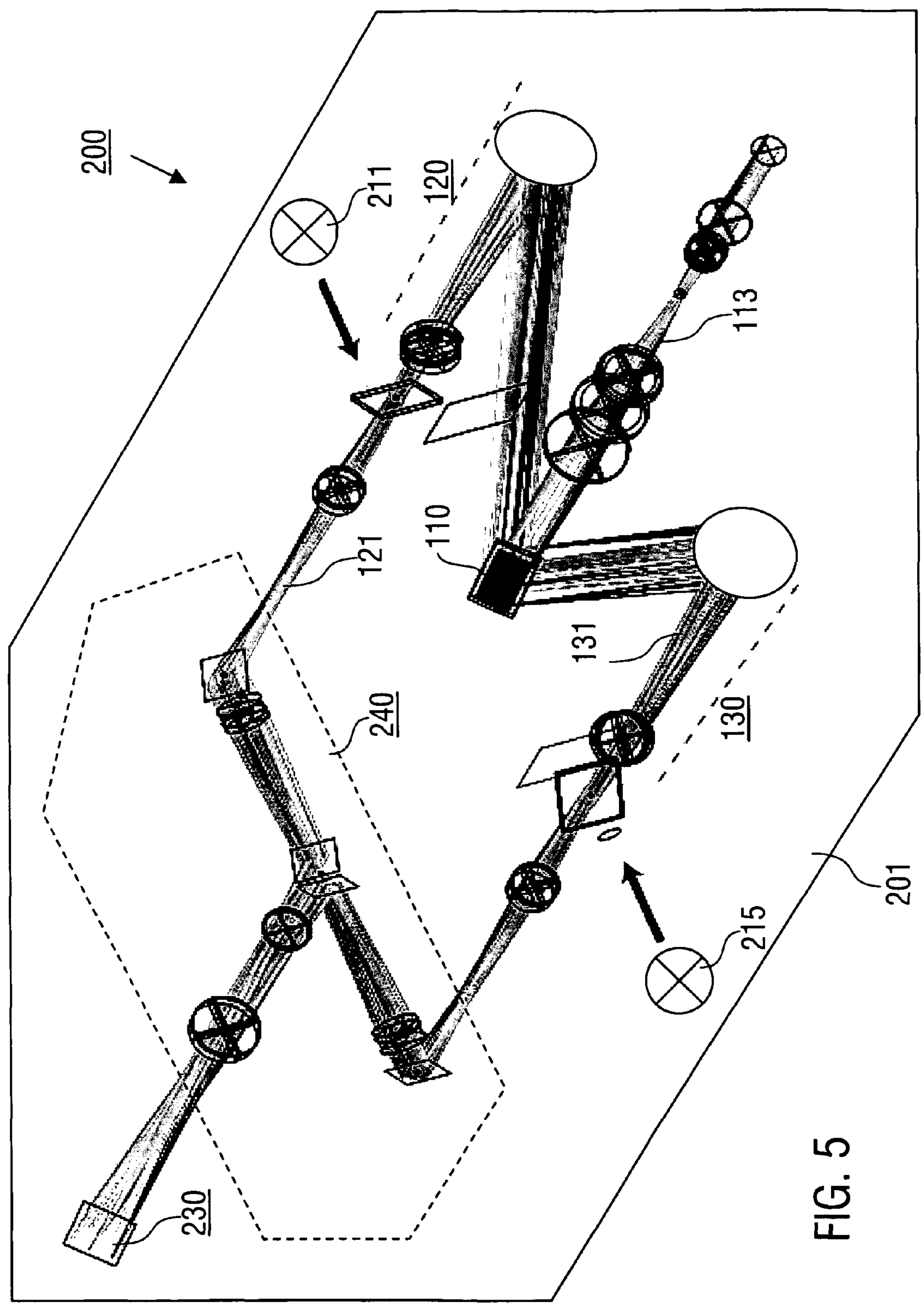
FIG. 5: a perspective view of the first embodiment of the spatio-temporally light modulated imaging system.

FIG. 5 illustrates a perspective schematic view of the optical components of the spatio-temporally light modulated imaging system 200 being adapted for illuminating the object with two light sources 211, 215. Basically, the spatio-temporally light modulated imaging system of FIG. 5 is structured as it is described above with reference to FIG. 1. FIG. 5 further illustrates that all optical components 110, 120, 130 of the optical modulator device, the image combiner device 240 and the detector device 230 are arranged in a common plane 201 including the monitor optical axis 113 and the first and second optical axes 121, 131. With an alternative embodiment, which is illustrated in FIG. 6, the image combiner device 240 can be modified such that the common detector path 242 is located in a plane 202 vertically shifted relative to the plane 201 of the optical axes 113, 121 and 131.

The features of the invention disclosed in the above description, the figures and the claims can be equally significant for realising the invention in its different embodiments, either individually or in combination.

The invention claimed is:

1. Optical modulator device, optionally for a spatio temporally light modulated imaging system, comprising:

a light modulating micro-mirror device comprising an array of mirror elements arranged in a modulator plane, wherein each of the mirror elements can be switched individually between first and second states with first and second tilting angles, respectively, relative to a modulator optical axis perpendicular to the modulator plane, and a first optical relaying device being arranged for relaying light between the minor elements in the first state and a first optical axis deviating from the modulator optical axis, wherein the first optical relaying device includes a first group of imaging elements being formed such that a planar light field perpendicular to the modulator optical axis is relayed to a first planar light field perpendicular to the first optical axis.

2. Optical modulator device according to claim 1, further comprising a second optical relaying device being arranged for relaying light between the minor elements in the second state and a second optical axis deviating from the modulator optical axis, wherein the second optical relaying device includes a second group of imaging elements being formed such that a planar light field perpendicular to the modulator optical axis is relayed to a second planar light field perpendicular to the second optical axis.

3. Optical modulator device according to claim 2, wherein at least one of the first and second groups of imaging elements comprises at least one refractive component and at least one reflective component.

4. Optical modulator device according to claim 3, wherein at least one of the first and second groups of imaging elements comprises a spherical mirror and at least one correction lens tilted relative to the first and second optical axes, respectively.

5. Optical modulator device according to claim 3, wherein at least one of the first and second groups of imaging elements comprises a spherical mirror and two correction lenses tilted relative to the first and second optical axes, respectively.

6. Optical modulator device according to claim 2, comprising at least one of the features:

the first optical axis is parallel to the modulator optical axis, the second optical axis is parallel to the modulator optical axis, at least one beam dump device is arranged for collecting residual light created at the mirror elements, the first optical relaying device and the second optical relaying device are symmetrically arranged relative to the modulator optical axis, the micro-mirror device, the first optical relaying device and the second optical relaying device are arranged on a common carrier plate.

7. Spatio-temporally light modulated imaging system, optionally for confocal imaging an object to be investigated, comprising:

a light source device being arranged for providing illumination light, an imaging optic being arranged for focusing the illumination light onto an object, a detector device comprising at least one detector camera being arranged for collecting detection light created in the object in response to the illumination light, and the optical modulator device according to claim 2, which is arranged such that the detection light is directed at least along the first optical axis towards the detector device, wherein the at least one detector camera is arranged such that the detection light is collected with normal incidence.

8. Imaging system according to claim 7, wherein the light source device comprises a first light source creating a first collimated beam of the illumination light, and a first dichroic mirror being arranged in the first optical axis for directing the first collimated beam of the illumination light along the first optical axis and the first optical relaying device towards the micro-mirror device.

9. Imaging system according to claim 8, wherein the light source device comprises a second light source creating a second collimated beam of the illumination light, and a second dichroic minor being arranged in the second optical axis for directing the second collimated beam of the illumination light along the second optical axis and the second optical relaying device towards the micro-mirror device.

10. Imaging system according to claim 7, wherein the detector device comprises two detector cameras each of which being arranged in one of the first and second optical axes with normal incidence of the detection light.

11. Imaging system according to claim 7, further comprising an image combiner device including image combiner reflectors being arranged for combining the first and second optical axes into a common detector path, wherein the at least one detector camera is arranged in the common detector path with normal incidence of the detection light.

12. Imaging system according to claim 11, wherein the image combiner reflectors are arranged such that portions of the detection light traveling along the first and second optical axes intersect each other along the common detector path with an angle below 5°.

13. Imaging system according to claim 11, wherein the image combiner reflectors are arranged such that portions of the detection light travelling along the first and second optical axes intersect each other along the common detector path with an angle below 3°.

14. Imaging system according to claim 11, wherein the image combiner device is arranged for deflecting detection light from a first plane spanned by the modulator optical axis, the first optical axis and the second optical axis to a second plane including the common detector path and the detector device.

15. Imaging system according to claim 7, wherein the optical modulator device is arranged such that the mirror elements in the first state are adapted for illuminating the object according to a predetermined pattern sequence of illumination spots focused along the modulator optical axis to conjugate locations of the object and for reflecting the detection light traveling from the conjugate locations along the modulator optical axis to the first optical axis towards the detector device for forming a conjugate image $I_c$, and the mirror elements in the second state are adapted for reflecting the detection light travelling from the non-conjugate locations along the modulator optical axis to the second optical axis towards the detector device for forming a non-conjugate image $I_{nc}$.

16. Method of confocal optical imaging using the imaging system according to claim 7, comprising the steps of:

providing illumination light with the light source device, focusing the illumination light onto the object to be investigated with the imaging optic, collecting detection light created in the object in response to the illumination light with the at least one detector camera, wherein the detection light is directed at least along the first optical axis towards the detector device and is received by the at least one detector camera with normal incidence.

17. Method of using an optical modulator device according to claim 1 for confocal optical imaging of an object or for fluorescence photodepletion or photoactivation microscopy methods.

* * * * *